(12) United States Patent
Kothari et al.

(10) Patent No.: US 8,644,499 B2
(45) Date of Patent: Feb. 4, 2014

(54) METHOD AND SYSTEM FOR SECURELY PROTECTING A SEMICONDUCTOR CHIP WITHOUT COMPROMISING TEST AND DEBUG CAPABILITIES

(75) Inventors: Love Kothari, Sunnyvale, CA (US); Paul Chou, Santa Clara, CA (US); John Markey, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 467 days.

(21) Appl. No.: 12/559,242

(22) Filed: Sep. 14, 2009

(65) Prior Publication Data

US 2011/0066835 A1    Mar. 17, 2011

(51) Int. Cl.
  *H04K 1/00* (2006.01)
  *G06F 9/00* (2006.01)

(52) U.S. Cl.
  USPC ........................................ 380/2; 713/1; 713/2

(58) Field of Classification Search
  USPC .............................................. 380/2; 713/1, 2
  See application file for complete search history.

(56) References Cited

U.S. PATENT DOCUMENTS

| | | | |
|---|---|---|---|
| 5,757,919 A | 5/1998 | Herbert et al. | |
| 6,629,309 B1 | 9/2003 | Allen, III | |
| 7,444,682 B2 | 10/2008 | Li et al. | |
| 8,255,700 B2* | 8/2012 | Kitariev et al. | 713/189 |
| 2002/0112157 A1 | 8/2002 | Doyle | |
| 2003/0035320 A1 | 2/2003 | Sung et al. | |
| 2004/0025010 A1* | 2/2004 | Azema et al. | 713/156 |
| 2005/0132186 A1* | 6/2005 | Khan et al. | 713/165 |
| 2006/0130149 A1 | 6/2006 | Xiang | |
| 2007/0157000 A1 | 7/2007 | Qawami et al. | |
| 2007/0277060 A1 | 11/2007 | Cornwell et al. | |
| 2007/0294497 A1 | 12/2007 | Chen | |
| 2008/0148001 A1 | 6/2008 | Gehrmann et al. | |
| 2009/0288160 A1* | 11/2009 | Esliger et al. | 726/17 |
| 2010/0199077 A1* | 8/2010 | Case et al. | 713/1 |
| 2010/0217964 A1* | 8/2010 | Peterka et al. | 713/2 |

* cited by examiner

*Primary Examiner* — Carl Colin
*Assistant Examiner* — S. Ali Zaidi
(74) *Attorney, Agent, or Firm* — Brinks Gilson & Lione

(57) ABSTRACT

A semiconductor chip may be operable to block the debug interfaces when the semiconductor chip boots up from the boot read-only memory (ROM). The semiconductor chip may be operable to authenticate a debug certificate received by the semiconductor chip and enable one or more debug interfaces in the semiconductor chip based on the information resulting from the authentication of the debug certificate. The debug certificate may be in a form of a cryptographic public key certificate. A unique device ID which may be generated at boot and stored in the memory may be used by the semiconductor chip to authenticate the debug certificate. The device ID may be generated using the cryptographic public key that is stored in the one-time programmable (OTP) memory in the semiconductor chip and a cryptographic hash algorithm.

20 Claims, 4 Drawing Sheets

METHOD AND SYSTEM FOR SECURELY PROTECTING A SEMICONDUCTOR CHIP WITHOUT COMPROMISING TEST AND DEBUG CAPABILITIES

CROSS-REFERENCE TO RELATED APPLICATIONS/INCORPORATION BY REFERENCE

[Not applicable]

FIELD OF THE INVENTION

Certain embodiments of the invention relate to semiconductor chips. More specifically, certain embodiments of the invention relate to a method and system for securely protecting a semiconductor chip without compromising test and debug capabilities.

BACKGROUND OF THE INVENTION

Semiconductor chips are electronic components that exploit the electronic properties of semiconductor materials, principally silicon, germanium and gallium arsenide. Semiconductor chips are manufactured both as single discrete devices and as integrated circuits (ICs), which consist of a number of devices manufactured and interconnected on a single semiconductor substrate.

Semiconductor chips, for example, the processor chips to be used in mobile handsets may have a boot read-only memory (ROM) with boot code integrated into their silicon so such a chip could perform quite sophisticated boot sequence on its own and load boot programs from various sources like NAND flash, SD or MMC card and so on. Also a boot ROM is often able to load boot loader or diagnostic program via serial interfaces like UART, SPI, USB and so on.

Semiconductor chips may be equipped with a one-time programmable (OTP) memory. The OTP memory is a field-programmable logic array (FPLA) that it may not be updated and reused after its initial programming. In other words, the OTP memory may be programmed once and may not be subsequently reprogrammed. The data stored in the OTP memory may be used for various customer specific applications such as, for example, enabling configuring chip usage features, authenticating any secondary boot images (for example, NOR, NAND, USB, UART flashes), authenticating any other codes running on the chip, etc.

Semiconductor chips may have one or more of the plurality of debug interfaces. Debug interfaces provide access capabilities used by test and/or debug tools for testing and/or debugging semiconductor chips or devices. Examples of debug interfaces may include JTAG access ports, trace auxiliary ports, snoop interfaces, etc.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for securely protecting a semiconductor chip without compromising test and debug capabilities, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for securely protecting a semiconductor chip without compromising test and debug capabilities. In various embodiments of the invention, a semiconductor chip comprising one or more debug interfaces may be operable to lock out or block the one or more debug interfaces when the semiconductor chip boots up from the boot read-only memory (ROM). During the process of testing and/or debugging the semiconductor chip, the semiconductor chip may be operable to authenticate a debug certificate received by the semiconductor chip and enable the one or more debug interfaces in the semiconductor chip based on the information resulting from the authentication of the debug certificate. The debug certificate may comprise a cryptographic public key certificate which may be signed and issued by either the chip manufacturer or its customer. The semiconductor chip may be operable to generate a unique device ID at boot using the cryptographic public key that is stored in the one-time programmable (OTP) memory in the semiconductor chip and a cryptographic hash algorithm such as a SHA algorithm and store the device ID in the memory in the semiconductor chip. The cryptographic public key may be in a random key format that is generated using the random number generator (RNG) in the semiconductor chip during the OTP memory programming process. The unique device ID may be used by the semiconductor chip to authenticate the debug certificate. In instances when no debug certificate is presented, the semiconductor chip may be operable to lock out or block the one or more debug interfaces. The semiconductor chip may also be operable to permanently lock out or block the one or more debug interfaces upon booting of the semiconductor chip.

Figure 1:
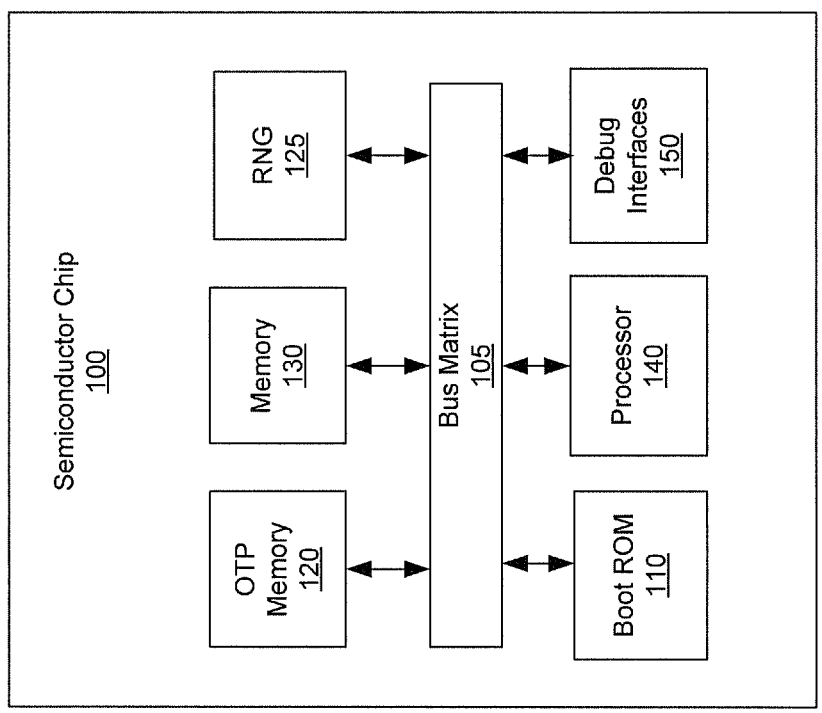
FIG. 1 is a block diagram illustrating an exemplary semiconductor chip, in accordance with an embodiment of the invention.

FIG. 1 is a block diagram illustrating an exemplary semiconductor chip, in accordance with an embodiment of the invention. Referring to FIG. 1, there is shown a semiconductor chip 100. The semiconductor chip 100 may comprise a bus matrix 105, a boot ROM 110, an OTP memory 120, a random number generator (RNG) 125, a memory 130, a processor 140 and a plurality of debug interfaces 150.

The bus matrix 105 may comprise suitable logic, circuitry, interfaces and/or code that may be operable to provide communication connections for transferring data among modules in the semiconductor device 100. The bus matrix 105 may be operable to provide communication connections for the boot ROM 110, the OTP memory 120, the RNG 125, the memory 130, the processor 140 and the plurality of debug interfaces 150.

The boot ROM 110 may comprise suitable logic, circuitry, interfaces and/or code that may be operable to perform booting process. The boot ROM 110 may comprise boot code and/or customer data. The boot code may comprise booting instructions and/or other algorithms to be executed during power up or reboot. The boot code may be developed in a secure environment with restricted access and may be thoroughly tested prior to the tape-out stage or the final stage of the chip design cycle. The customer data may comprise, for example, cryptographic keys for authentication and/or decryption.

The OTP memory 120 may comprise suitable logic, circuitry, interfaces and/or code that may be operable to store data. The data stored in the OTP memory 120 may be programmed once and may not be subsequently reprogrammed. The data stored in the OTP memory 120 may be stored in a random format generated using the RNG 125. The data stored in the OTP memory 120 may comprise keys that may be used by the boot code in the boot ROM 110 to authenticate any secondary boot images such as, for example, NOR, NAND, and/or USB flashes. The data stored in the OTP memory 120 may comprise customer specific secrets or keys that may be used to authenticate any other codes which may run on the semiconductor device 100. The data stored in the OTP memory 120 may comprise a cryptographic public key which is unique to an individual semiconductor chip 100 that may be used to generate a unique device ID using a cryptographic hash algorithm such as, for example, a SHA algorithm, when the individual semiconductor chip 100 boots up. This device ID which may be stored, for example, in the memory 130 may be used to authenticate and enable one or more debug interfaces 150 during the process of testing and/or debugging the semiconductor chip 100. The OTP memory 120 may also be configured to comprise an optional key which may be used to permanently lock out or block one or more debug interfaces 150 in an individual semiconductor chip 100 when the individual semiconductor chip 100 boots up. The data, for example, the customer specific secrets or keys and/or cryptographic public keys stored in the OTP memory 120 may be read by the boot code at power up and may be hidden afterwards from any further reads until next reset, thus eliminating any chances of leaking the data out.

The RNG 125 may comprise suitable logic, circuitry, interfaces and/or code that may be operable to generate a random sequence of numbers or symbols. The RNG 125 may generate the random numbers or symbols using, for example, a pseudo-random algorithm. During the process of programming the OTP memory 120, the RNG 125 may be used to generate a random data, for example, a random key to be stored in the OTP memory 120.

The processor 140 may comprise suitable logic, circuitry, interfaces and/or code that may be operable to communicate with the memory 130 to provide various executable algorithms for various operations and applications such as the operations and/or the applications in a mobile handset.

The memory 130 may comprise suitable logic, circuitry, interfaces and/or code that may be operable to store information such as executable instructions and data that may be utilized by the processor 140 and/or by the boot ROM 110. The memory 130 may store the unique device ID which may be used for authenticating and enabling one or more debug interfaces 150 during the process of testing and/or debugging the semiconductor chip 100.

Each of the plurality of debug interfaces 150 may comprise suitable logic, circuitry, interfaces and/or code that may be operable to provide access capabilities used by test and/or debug tools for testing and/or debugging the semiconductor chip 100. Examples of the debug interfaces 150 may comprise JTAG access ports, trace auxiliary ports and snoop interfaces. At boot, the plurality of debug interfaces 150 may be locked out or blocked for the purpose of protecting the semiconductor chip 100 against malicious attacks and/or unsolicited tasks. For each individual semiconductor chip 100, one or more debug interfaces 150 may be individually enabled after booting and authenticating using the unique device ID during the process of testing and/or debugging the semiconductor chip 100.

In operation, the semiconductor chip 100 may boot up from the boot ROM 110 during power up or reboot. The plurality of debug interfaces 150 may be locked out or blocked at boot. The OTP memory 120 may comprise customer specific secrets or keys which may be used to authenticate any secondary boot images and/or any other code which may run on the semiconductor chip 100. The OTP memory 120 may comprise a cryptographic public key which may be used to generate a unique device ID at boot. The unique device ID may be stored, for example, in the memory 130. The unique device ID may be generated using a cryptographic hash algorithm, for example, a SHA algorithm. The customer specific secrets or keys and/or cryptographic public keys stored in the OTP memory 120 may be in random key formats generated using the RNG 125 during the process of programming the OTP memory 120. The OTP memory 120 may also be configured to comprise an optional key which may be used to permanently lock out or block one or more debug interfaces 150 at boot. During the process of testing and/or debugging the semiconductor chip 100, the unique device ID may be used to authenticate and enable one or more debug interfaces if they are not permanently locked out or blocked.

Figure 2:
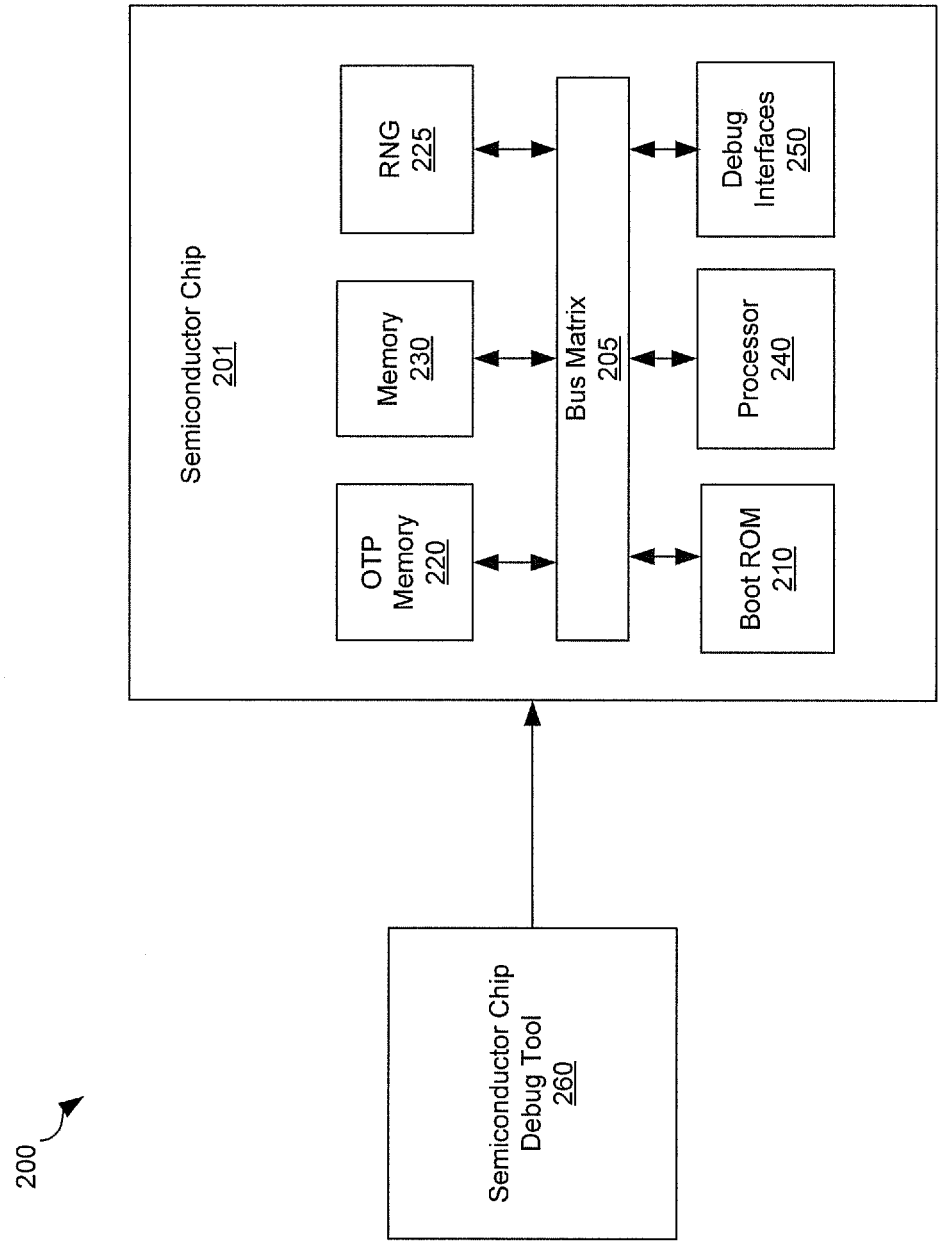
FIG. 2 is a block diagram illustrating an exemplary system that is operable to provide securely protecting a semiconductor chip without compromising test and debug capabilities, in accordance with an embodiment of the invention.

FIG. 2 is a block diagram illustrating an exemplary system that is operable to provide securely protecting a semiconductor chip without compromising test and debug capabilities, in accordance with an embodiment of the invention. Referring to FIG. 2, there is shown a semiconductor chip debug system 200. The semiconductor chip debug system 200 may comprise a semiconductor chip 201 and a semiconductor chip debug tool 260. The semiconductor 201 may comprise a bus matrix 205, a boot ROM 210, an OTP memory 220, a RNG 225, a memory 230, a processor 240 and a plurality of debug interfaces 250.

The semiconductor debug tool 260 may comprise suitable logic, circuitry, interfaces and/or code that may be operable to test and/or debug the semiconductor chip 201 via one of the plurality of debug interfaces 250 in the semiconductor chip 201. Some examples of the semiconductor chip debug tools 260 may comprise JTAG testing and/or debugging tools, trace tools and snoop sniffer tools. The semiconductor chip debug tool 260 may be operable to present a debug certificate to an individual semiconductor chip 201. The debug certificate may be in a form of a cryptographic public key certificate or digital certificate which may be signed securely by either the chip manufacturer or its customer for an individual semiconductor chip 201. During the process of testing and/or debugging the individual semiconductor chip 201, the individual semiconductor chip 201 may be operable to authenticate the debug certificate using the device ID stored in the memory 230 in the individual semiconductor chip 201. If the authentication succeeds, one or more debug interfaces 250 may be enabled based on the information resulting from the authentication of the debug certificate if they are not permanently locked out or blocked. In this regard, the debug certificate is tied to the unique device ID of an individual semiconductor chip 201, so it is tied to that individual semiconductor chip 201.

The semiconductor chip 201 may be substantially similar to the semiconductor device 100 in FIG. 1. The bus matrix 205 may be substantially similar to the bus matrix 105 in FIG. 1. The boot ROM 210 may be substantially similar to the boot ROM 110 in FIG. 1. The OTP memory 220 may be substantially similar to the OTP memory 120 in FIG. 1. The RNG 225 may be substantially similar to the RNG 125 in FIG. 1. The memory 230 may be substantially similar to the memory 130 in FIG. 1. The processor 240 may be substantially similar to the processor 140 in FIG. 1. The plurality of debug interfaces 250 may be substantially similar to the plurality of debug interfaces 150 in FIG. 1.

In operation, a cryptographic public key, for example, a random key generated using the RNG 225 may be programmed and stored into the OTP memory 220 in the individual semiconductor chip 201 during the process of programming the OTP memory 220 for the purpose of authenticating debug certificates. Corresponding debug certificates may be signed and issued for the individual semiconductor chip 201 by either the chip manufacturer or its customer. When the individual semiconductor chip 201 boots up from the boot ROM 210, the plurality of debug interfaces 250 in the individual semiconductor chip 201 may be locked out or blocked and a unique device ID may be generated using the above mentioned random key and a cryptographic hash algorithm such as, for example a SHA algorithm. The unique device ID may be stored, for example in the memory 230. During the process of testing and/or debugging the individual semiconductor chip 201, the semiconductor chip debug tool 260 may present a debug certificate to the individual semiconductor chip 201. The individual semiconductor chip 201 may be operable to authenticate the debug certificate using the device ID. If the authentication succeeds, the individual semiconductor chip 201 may enable one or more debug interfaces 250 based on the information resulting from the authentication of the debug certificate if they are not permanently locked out or blocked. In this regard, a debug certificate for an individual semiconductor chip 201 may only work for that individual semiconductor chip 201 and may not comprise security of other chips. If no debug certificates are presented, the plurality of debug interfaces 250 may remain locked out or blocked. Thus, the only way to enable one or more debug interfaces 250 in the individual semiconductor chip 201 is by presenting a debug certificate which is tied to that individual semiconductor chip 201.

Figure 3:
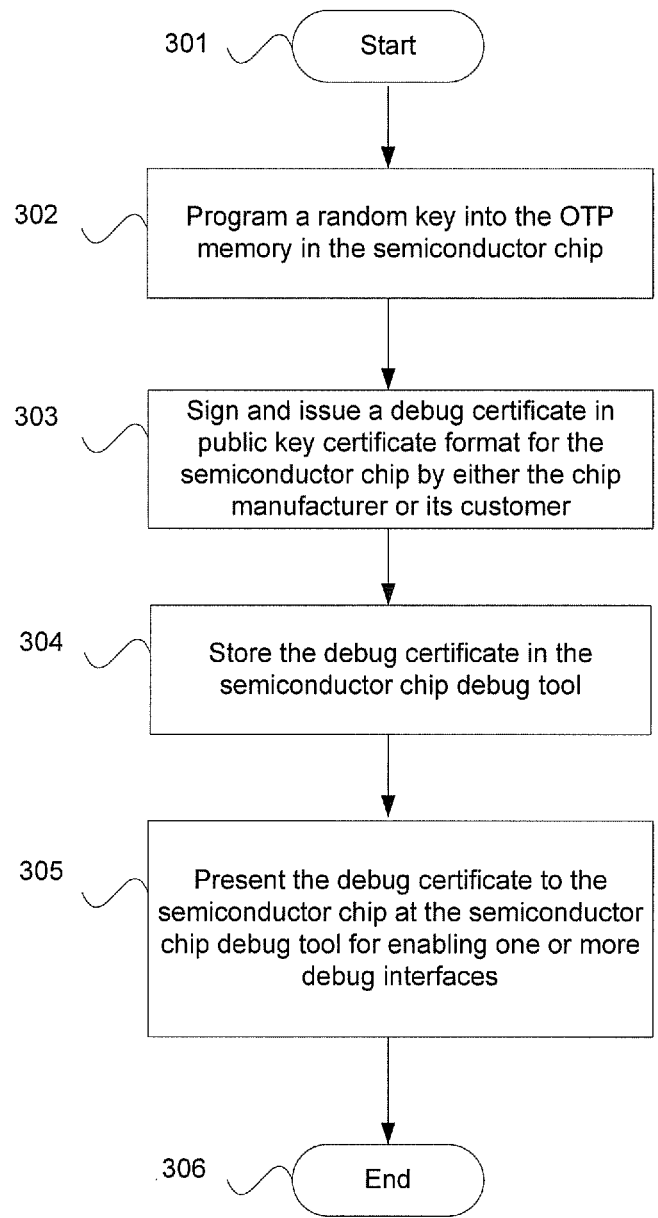
FIG. 3 is a flow chart illustrating exemplary steps for presenting debug certificate to a semiconductor chip for enabling one or more of debug interfaces, in accordance with an embodiment of the invention.

FIG. 3 is a flow diagram illustrating exemplary steps for presenting debug certificate to a semiconductor chip for enabling one or more debug interfaces, in accordance with an embodiment of the invention. Referring to FIG. 3, in step 302 after the start step 301, a random key may be programmed into the OTP memory 220 in the semiconductor chip 201 during the process of programming the OTP memory 220 for generating the device ID to authenticate debug certificates. In step 303, a debug certificate is signed and issued in public key certificate format for the semiconductor chip 201 by either the chip manufacturer or its customer. In step 304, the debug certificate is stored in the semiconductor chip debug tool 260. In step 305, the semiconductor chip debug tool 260 may be operable to present the debug certificate to the semiconductor chip 201 for enabling one or more debug interfaces 250 during the process of testing and/or debugging the semiconductor chip 201. The exemplary steps may proceed to the end step 306.

Figure 4:
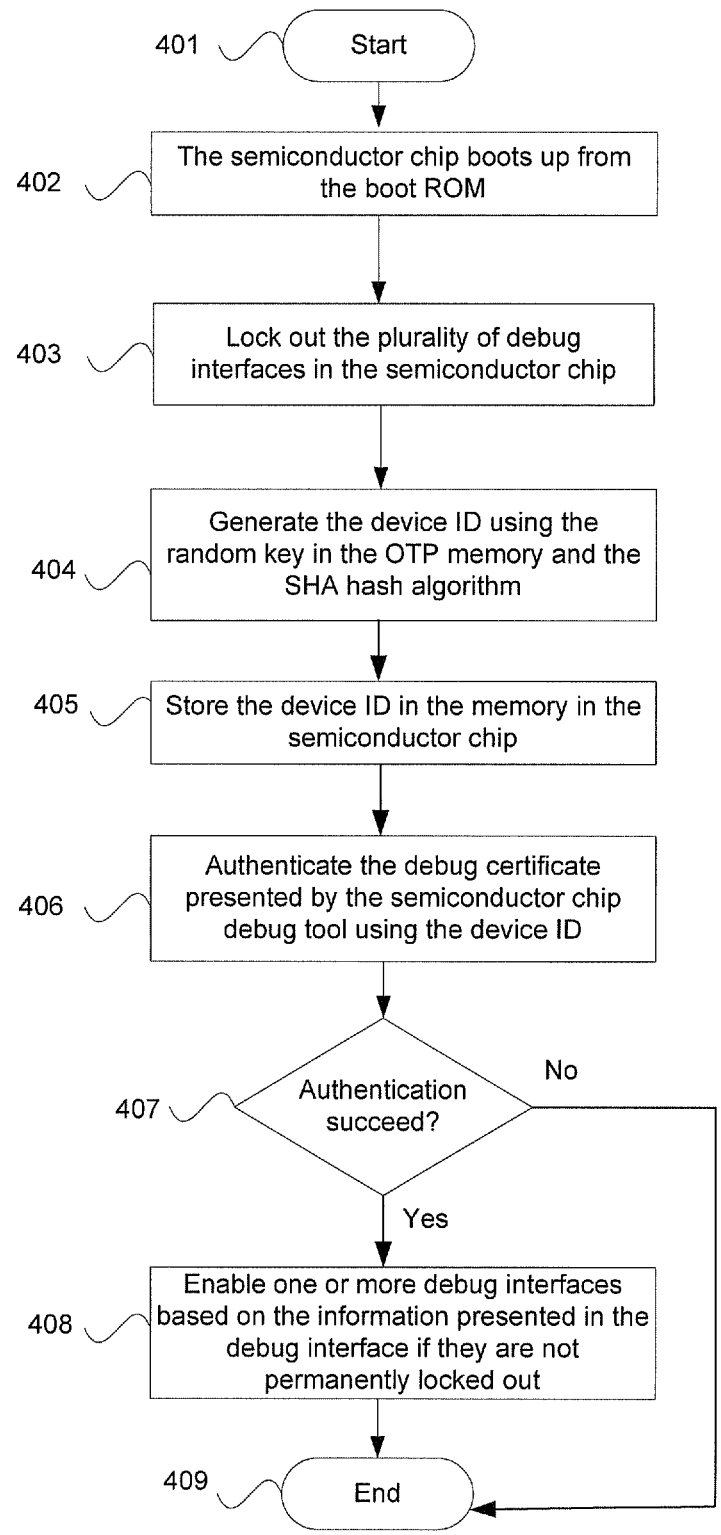
FIG. 4 is a flow chart illustrating exemplary steps for securely protecting a semiconductor chip without compromising test and debug capabilities, in accordance with an embodiment of the invention.

FIG. 4 is a flow diagram illustrating exemplary steps for securely protecting a semiconductor chip without compromising test and debug capabilities, in accordance with an embodiment of the invention. Referring to FIG. 4, in step 402 after the start step 401, the semiconductor chip 201 may boot up from the boot ROM 210. In step 403, the semiconductor chip 201 may be operable to lock out or block the plurality of debug interfaces 250 at boot. In step 404, the semiconductor chip 201 may be operable to generate the device ID using the random key in the OTP memory 220 and the SHA hash algorithm. In step 405, the semiconductor chip 201 may be operable to store the device ID in the memory 230 in the semiconductor chip 201. In step 406, the semiconductor chip 201 may be operable to use the device ID to authenticate the debug certificate presented by the semiconductor chip debug tool 260. In step 407, the authentication result is checked. In instances when the authentication succeeds, the exemplary steps may proceed to step 408. In step 408, the semiconductor chip 201 may be operable to enable one or more debug interfaces 250 based on the information presented in the debug certificate if one or more debug interfaces 250 are not permanently locked out or blocked. The exemplary steps may proceed to the end step 409. In step 407, in instances when the authentication fails, the exemplary steps may proceed to the end step 409.

In various embodiments of the invention, a semiconductor chip 201 comprising one or more debug interfaces 250 may be operable to lock out or block the one or more debug interfaces 250 when the semiconductor chip 201 boots up from the boot read-only memory (ROM) 210. During the process of testing and/or debugging the semiconductor chip 201, the semiconductor chip 201 may be operable to authenticate a debug certificate received by the semiconductor chip 201 and enable the one or more debug interfaces 250 in the semiconductor chip 201 based on the information resulting from the authentication of the debug certificate. The debug certificate may comprise a cryptographic public key certificate which may be signed and issued by either the chip manufacturer or its customer. The semiconductor chip 201 may be operable to generate a unique device ID at boot using the cryptographic public key that is stored in the one-time programmable (OTP) memory 220 in the semiconductor chip 201 and a cryptographic hash algorithm such as a SHA algorithm and store the device ID in the memory 230 in the semiconductor chip 201. The cryptographic public key may be in a random key format that is generated using the random number generator (RNG) 225 in the semiconductor chip 201 during the OTP memory programming process. The unique device ID may be used by the semiconductor chip 201 to authenticate the debug certificate. In instances when no debug certificate is presented, the semiconductor chip 201 may be operable to lock out or block the one or more debug interfaces 250. The semiconductor chip 201 may also be operable to permanently lock out or block the one or more debug interfaces 250 upon booting of the semiconductor chip.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for securely protecting a semiconductor chip without compromising test and debug capabilities.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system, comprising:
    a boot read-only memory (ROM);
    semiconductor chip debug tool operable to debug a semiconductor chip via debug interfaces of a semiconductor chip; and
    a semiconductor chip that is communicatively coupled to the semiconductor chip debug tool, the semiconductor chip being operable to:
    boot up according to the boot ROM;
    identify a debug interface of a plurality of debug interfaces using a first key stored in a one time programmable (OTP) memory;
    block a plurality of debug interfaces in the semiconductor chip during boot up of the semiconductor chip;
    permanently block with the first key the identified debug interface of the plurality of debug interfaces during boot up of the semiconductor chip;
    generate a device identification referring to the semiconductor chip, the generation of the device identification using a second key stored in the OTP memory;
    store the device identification in memory of the semiconductor chip;
    use the device identification to authenticate a debug certificate associated with a debug interface of the plurality of debug interfaces; and
    enable the associated debug interface based on information in the debug certificate, where the authentication is successful and where the associated debug interface is not the permanently blocked debug interface.

2. The system of claim 1, wherein the permanently blocking of the identified debug interface of the plurality of debug interfaces is until a next reset of the semiconductor chip.

3. The system of claim 1, wherein the generating of the device identification referring to the semiconductor chip also uses a secure hash algorithm.

4. The system of claim 3, wherein the secure hash algorithm is embedded in the semiconductor chip.

5. The system of claim 1, wherein the debug certificate is provided by the semiconductor chip debug tool.

6. The system of claim 1, wherein the second key is in a random key format generated by a random number generator.

7. The system of claim 6, wherein the random number generator is embedded in the semiconductor chip.

8. The system of claim 7, wherein the random key format is generated during programming of the OTP memory.

9. The system of claim 1, wherein the one time programmable (OTP) memory is embedded in the semiconductor chip.

10. The system of claim 1, wherein the boot ROM is embedded in the semiconductor chip.

11. The system of claim 1, wherein the debug certificate uniquely corresponds to the associated debug interface of the plurality of the debug interfaces.

12. The system of claim 1, wherein the semiconductor chip debug tool is operable to use Joint Test Action Group (JTAG) testing to debug a semiconductor chip.

13. The system of claim 1, wherein the semiconductor chip debug tool is operable to use trace tools to debug a semiconductor chip.

14. The system of claim 1, wherein the semiconductor chip debug tool is operable to use sniffer tools to debug a semiconductor chip.

15. The system of claim 1, wherein the debug certificate is provided by a semiconductor chip debug tool external to the semiconductor chip.

16. A semiconductor chip, comprising:
    a boot read-only memory (ROM) configured to at least partially control boot up of the semiconductor chip;
    a plurality of debug interfaces configured to provide interfaces to communicate with a semiconductor chip debug tool, wherein the semiconductor chip debug tool is configured to communicate information to test or debug the semiconductor chip;
    and
    a processor configured to:
    identify a debug interface of the plurality of debug interfaces using a first key stored in a one time programmable (OTP) memory, the OTP memory being embedded in the semiconductor chip;
    block the plurality of debug interfaces in the semiconductor chip during boot up of the semiconductor chip;
    permanently block with the first key the identified debug interface of the plurality of debug interfaces during boot up of the semiconductor chip;
    generate a device identification referring the semiconductor chip, the generation of the device identification using a second key stored in the OTP memory;
    store the device identification in a memory device embedded in the semiconductor chip;
    use the device identification to authenticate a debug certificate associated with a debug interface of the plurality of debug interfaces; and
    enable the associated debug interface based on information in the debug certificate, where the authentication is successful and where the associated debug interface is not the permanently blocked debug interface.

17. The semiconductor chip of claim 16, further comprising a bus matrix, wherein the bus matrix communicatively couples the OTP memory, the memory device, the boot ROM, the processor, and the plurality of debug interfaces.

18. The semiconductor chip of claim 16, wherein the second key is in a random key format generated by a random number generator, wherein the random number generator is embedded in the semiconductor chip, and wherein the random number generator is communicatively coupled to the OTP memory.

19. A method, comprising:
- activating a semiconductor chip;
- identifying a debug interface of a plurality of debug interfaces of the semiconductor chip using a first key stored in a one time programmable (OTP) memory of the semiconductor chip;
- permanently blocking with the first key the identified debug interface of the plurality of debug interfaces during activation of the semiconductor chip;
- generating a device identification referring to the semiconductor chip, the generation of the device identification using a second key stored in the OTP memory;
- using the device identification to authenticate a debug certificate associated with a debug interface of the plurality of debug interfaces; and
- enabling the associated debug interface based on information in the debug certificate, where the authentication is successful and where the associated debug interface is not the permanently blocked debug interface.

20. The method of claim 19, wherein the permanently blocking of the identified debug interface of the plurality of debug interfaces is until a reactivation of the semiconductor chip.

* * * * *